(12) United States Patent
Chang et al.

(10) Patent No.: US 12,517,049 B2
(45) Date of Patent: Jan. 6, 2026

(54) DETECTION SYSTEM AND A PORTABLE DETECTION DEVICE

(71) Applicant: ACADEMIA SINICA, Taipei (TW)

(72) Inventors: Huan-Cheng Chang, Taipei (TW); Yuen-Yung Hui, Taipei (TW); Yi-Xiu Tang, New Taipei (TW)

(73) Assignee: ACADEMIA SINICA, Taipei (TW)

(*) Notice: Subject to any disclaimer, the term of this patent is extended or adjusted under 35 U.S.C. 154(b) by 670 days.

(21) Appl. No.: 17/960,063

(22) Filed: Oct. 4, 2022

(65) Prior Publication Data
US 2023/0103404 A1    Apr. 6, 2023

Related U.S. Application Data

(60) Provisional application No. 63/252,646, filed on Oct. 6, 2021.

(51) Int. Cl.
*B01L 3/00*    (2006.01)
*B01D 15/08*   (2006.01)
(Continued)

(52) U.S. Cl.
CPC .......... *G01N 21/6428* (2013.01); *G01N 21/47* (2013.01); *G01N 33/558* (2013.01); *G01N 2201/0221* (2013.01)

(58) Field of Classification Search
CPC .. G01N 21/6428; G01N 21/47; G01N 33/558; G01N 2201/0221;
(Continued)

(56) References Cited

U.S. PATENT DOCUMENTS

2002/0090650 A1   7/2002   Empedocles et al.
2006/0290936 A1 * 12/2006  Imura .................... G01N 21/57
                                                  356/446
(Continued)

FOREIGN PATENT DOCUMENTS

CN    106248764 B  *  3/2020  ........... G01N 27/447
JP    2003329962 A  * 11/2003

OTHER PUBLICATIONS

Huang, Lihua, et al. "A simple optical reader for upconverting phosphor particles captured on lateral flow strip." IEEE Sensors Journal 9.10 (2009): 1185-1191. (Year: 2009).*

*Primary Examiner* — Jennifer Wecker
*Assistant Examiner* — Oyeleye Alexander Alabi
(74) *Attorney, Agent, or Firm* — MUNCY, GEISSLER, OLDS & LOWE, P.C.

(57) ABSTRACT

A detection system and a portable detection device for detecting an object of interest in a lateral flow immunoassay strip. The lateral flow immunoassay strip has a detection carrier and a reporter, the detection carrier has a control zone and a test zone. The detection system has a laser light source, a scanning and spatial modulation module, a signal acquisition assembly, and a processing device. The laser light source provides a laser light. The scanning and spatial modulation module receives the laser light, and then provides a scanning and spatially modulating laser beam for irradiating a lateral flow immunoassay strip to generate a detecting signal. The signal acquisition assembly receives the detecting signal. The processing device electronically connects to the signal acquisition assembly and receives the detecting signal from the signal acquisition assembly.

14 Claims, 8 Drawing Sheets

(51) Int. Cl.

| | | |
|---|---|---|
| *B01F 33/302* | (2022.01) | |
| *B01F 33/3033* | (2022.01) | |
| *B01L 7/00* | (2006.01) | |
| *B01L 9/00* | (2006.01) | |
| *B65G 47/80* | (2006.01) | |
| *B82Y 20/00* | (2011.01) | |
| *B82Y 30/00* | (2011.01) | |
| *B82Y 40/00* | (2011.01) | |
| *C12M 1/34* | (2006.01) | |
| *C12M 3/06* | (2006.01) | |
| *C12N 1/14* | (2006.01) | |
| *C12N 1/20* | (2006.01) | |
| *C12Q 1/02* | (2006.01) | |
| *C12Q 1/6806* | (2018.01) | |
| *C12Q 1/6844* | (2018.01) | |
| *C12Q 1/6848* | (2018.01) | |
| *C12Q 1/686* | (2018.01) | |
| *G01N 15/10* | (2024.01) | |
| *G01N 15/14* | (2024.01) | |
| *G01N 15/1433* | (2024.01) | |
| *G01N 21/29* | (2006.01) | |
| *G01N 21/47* | (2006.01) | |
| *G01N 21/64* | (2006.01) | |
| *G01N 21/65* | (2006.01) | |
| *G01N 30/02* | (2006.01) | |
| *G01N 30/72* | (2006.01) | |
| *G01N 33/543* | (2006.01) | |
| *G01N 33/557* | (2006.01) | |
| *G01N 33/558* | (2006.01) | |
| *G01N 33/574* | (2006.01) | |
| *G01N 33/58* | (2006.01) | |

(58) Field of Classification Search
CPC ..... G01N 33/54388; G01N 2021/7786; G01N 2021/8488; G01N 2201/06113; G01N 2201/105; G01N 21/8483
See application file for complete search history.

(56) References Cited

U.S. PATENT DOCUMENTS

| | | | |
|---|---|---|---|
| 2009/0012721 A1* | 1/2009 | Kimura | G01N 21/274 |
| | | | 702/23 |
| 2009/0125242 A1* | 5/2009 | Choi | G01N 21/51 |
| | | | 702/19 |
| 2010/0267049 A1* | 10/2010 | Rutter | G01N 21/6428 |
| | | | 435/7.1 |
| 2013/0221209 A1* | 8/2013 | Kamba | G01N 21/3581 |
| | | | 250/225 |
| 2014/0118524 A1* | 5/2014 | Munck | G02B 21/008 |
| | | | 382/133 |
| 2017/0211982 A1* | 7/2017 | Lenigk | G01N 33/49 |
| 2018/0188152 A1* | 7/2018 | Vercruysse | G02B 6/30 |
| 2021/0033842 A1* | 2/2021 | Shkolnikov | G01N 15/1425 |
| 2021/0263026 A1* | 8/2021 | Lawless | G01N 33/74 |
| 2021/0278423 A1 | 9/2021 | Donnelly | |

* cited by examiner

DETECTION SYSTEM AND A PORTABLE DETECTION DEVICE

BACKGROUND

1. Technical Field

The present disclosure is related a detection system and a portable detection device, specifically to a detection system and a portable detection device for detecting of objects of interest in lateral flow immunoassay strip by a scanning and spatially modulating laser beam.

2. Description of the Related Art

Enzyme-linked immunosorbent assay (hereinafter referred to as ELISA) and lateral flow immunoassay (hereinafter referred to as LFIA) are two commonly used immunodiagnostic tools. Both methods are based on specific antigen antibody reactions. Comparing with ELISA, LFIA is fast, low-cost, and scalable. LFIA first appeared in commercial use as a general-purpose pregnancy test in 1988 and has become one of the most promising methods for point-of-care testing, including one-step home diagnosis of COVID-19 nowadays. A previous study has reported that the limit of detection (hereinafter referred to as LOD) for 40-nm gold nanoparticles (hereinafter referred to as GNPs) deposited on a nitrocellulose (hereinafter referred to as NC) membrane for a LFIA strip was $3.78 \times 10^6$ particles/mm$^2$, measured by using a photo scanner for the color intensity in the blue channel. Although the color readout method applied on LFIA strips is simple and direct, its detection sensitivity is low and its dynamic range is small. The typical limit of detection of the method in immunoassays is in the range of 1-10 ng/mL, comparable to that of color visualization on LFIA strips with the naked eye. More importantly, the result of LFIA strips is not quantitative enough to support decision making in point-of-care testing, telemedicine, and related diagnostics.

In view of above-mentioned deficiencies, various techniques have been developed to enhance the sensitivity as well as the quantification capability of gold nanoparticle-based LFIA strips, for example surface-enhanced Raman scattering (SERS), photothermal detection (PTD), and photoacoustic (PA) detection. The photothermal detection is most successful and has achieved a 10-fold improvement in detection sensitivity. The photothermal detection system typically consists of a continuous-wave laser as the excitation source to heat up gold nanoparticles, which strongly absorb visible light and emit infrared photons. An infrared camera then measures the temperature rises of the gold nanoparticles in both control and test zones. Since the amount of the heat generated increases in proportion to the amount of gold nanoparticles captured on the LFIA strips, this thermometric method is well suited for quantitative analysis. However, there are several drawbacks of above-mentioned technique as a point-of-care testing assessment tool. First, LFIA strips are typically composed of NC membrane cast directly on a polystyrene backing, whose temperature also increases upon exposure to the laser. Second, it is preferable to dry the LFIA strips before the photothermal detection measurement because the heat can be conducted quickly away from the laser-irradiated area when the sample is wet. Third, it takes time (up to 1 second) to heat up the membrane-bound reporters to reach their steady state, which limits the speed of the detection. Fourth, in order to achieve high sensitivity, a high-power laser is required to raise the temperatures of the reporters above the room temperature fluctuations (typically 0.1° C.). Fifth, the cost of the infrared camera is high and the portability of the instrument is low. Thus, there is a need for providing an improved detecting system to solve the drawbacks described above.

SUMMARY

In view of the problems mentioned above, the main purpose of the present disclosure is to provide a detection system and a portable detection device for detecting of objects of interest in a lateral flow immunoassay strip by scanning and spatially modulating laser beam such that the problem of poor sensitivity of conventional lateral flow immunoassay strips can be solved.

To achieve the above objective, the present disclosure provides a detection system for detecting an object of interest in in a lateral flow immunoassay strip, wherein the lateral flow immunoassay strip includes a detection carrier and a reporter, the detection carrier has a control zone and a test zone, the detection system includes a laser light source, a scanning and spatial modulation module, a signal acquisition assembly, and a processing device. The laser light source provides a laser light. The scanning and spatial modulation module receives the laser light, and then produce a scanning and spatially modulating laser beam for irradiating the reporters on the control zone and the test zone to generate a detecting signal. The signal acquisition assembly receives the detecting signal. The processing device electronically connects to the signal acquisition assembly and receives the detecting signal from the signal acquisition assembly.

According to an embodiment of the present disclosure, the scanning and spatial modulation module is a Galvo scanning mirror system; or the scanning and spatial modulation module comprises a stepper motor rotating a reflection mirror; i.e. the scanning and spatially modulating laser beam is produced by a Galvo scanning mirror system or by a reflection mirror driven by a stepper motor.

According to an embodiment of the present disclosure, the scanning and spatially modulating laser beam is provided by the Galvo scanning mirror system driven by a ramp voltage and a sinusoidal voltage at the frequency between 0 Hz and 1 kHz. The root mean square value of the sinusoidal voltage applied to the Galvo scanning mirror system is 0.2V for spatially modulating the laser light.

According to an embodiment of the present disclosure, a scan angle θ of the scanning and spatially modulating laser beam for irradiating a lateral flow immunoassay strip is ranged between 90°>θ>0° or 45°>θ>0°.

According to an embodiment of the present disclosure, the scanning and spatially modulating light is a continuous-wave green laser or a continuous-wave red laser.

According to an embodiment of the present disclosure, the signal acquisition assembly is a photodiode with a fluorescence filter for selectively detecting the detecting signal.

According to an embodiment of the present disclosure the fluorescence filter can be a green filter, an orange filter, or a yellow filter.

According to an embodiment of the present disclosure, the detecting signal comprising a scattering signal and a fluorescence signal and the orange filter is selected for detecting the fluorescence signal while the scanning and spatially modulating light is the continuous-wave green laser.

According to an embodiment of the present disclosure, the processing device comprises a microprocessor performing as a moving average smoothing filter and the second derivative or a lock-in amplifier to analyze the detecting signal.

According to an embodiment of the present disclosure, the processing device analyzes the detecting signal by integrating an intensity area of the test zone and the control zone respectively, and then determining the ratio between the test zone and the control zone to quantify a concentration of the object of interest.

According to an embodiment of the present disclosure, the reporter is gold nanoparticles or colored latex beads and the detection carrier is a nitrocellulose membrane.

To achieve the above objective, the present disclosure provides a portable detection device for detecting an object of interest in a lateral flow immunoassay strip, wherein the lateral flow immunoassay strip comprises a detection carrier and a reporter, the detection carrier has a control zone and a test zone, the portable detection device includes a laser light source, a scanning and spatial modulation module, a signal acquisition assembly, a processing device, and a housing. The laser light source provides a laser beam to the scanning and spatial modulation module to irradiate the reporters on the control zone and the test zone to generate a detecting signal. The signal acquisition assembly receives the detecting signal. The processing device electronically connects to the signal acquisition assembly, wherein the processing device receives the detecting signal from the signal acquisition assembly. The housing accommodates the laser light source, the signal acquisition assembly, and the processing device.

Here, the present disclosure provides a detection system and a portable detection device for detecting an object of interest in a lateral flow immunoassay strip. The detection system and a portable detection of the present disclosure take advantage of the exceptionally large absorption cross sections of reporters (such as gold nanoparticles or colored latex beads) on the detection carrier in a lateral flow immunoassay strip, the strong light scattering and fluorescence emission from detection carrier (nitrocellulose membrane), the fast response of photodetectors, as well as the straight line configuration of both control zone and test zone on the lateral flow immunoassay strip. These four characteristics together enable a higher sensitivity than color visualization of a lateral flow immunoassay strip with the naked eye by 1 order of magnitude. Additionally, both the detection system and the portable detection of the present disclosure are applicable for dry and wet lateral flow immunoassay strips. Furthermore, the portable detection of the present disclosure is a low-cost and handheld device can be readily manufactured in a mass production manner. The detection system and a portable detection of the present disclosure are essential to make progress towards the realization of high-sensitivity point-of-care testing with the capability of one-step home diagnosis, not only for COVID-19 but for other infectious and chronic diseases as well.

BRIEF DESCRIPTION OF THE DRAWINGS

FIG. 10 (b) illustrates second-order-differentiated signals obtained with QMIA for SARS-CoV-2 nucleoproteins using CLBs as the reporters. The nucleoproteins concentration is 7.8 ng/mL.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1A:
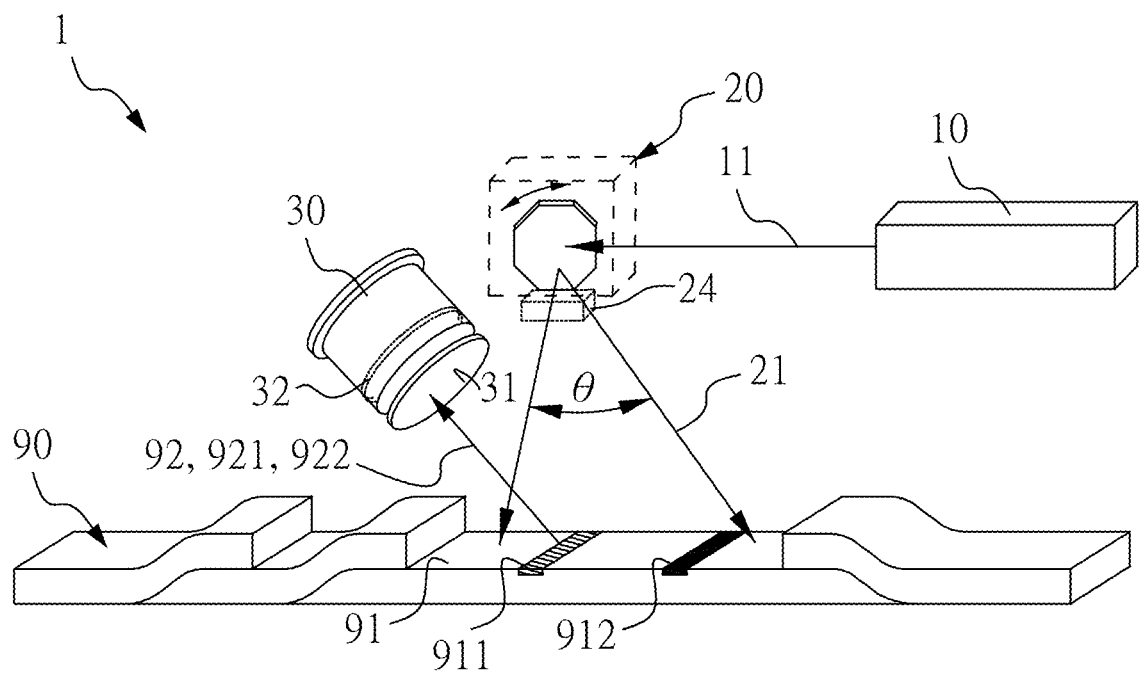
FIG. 1A illustrates a schematic diagram of a first embodiment of a detection system of the present disclosure.
Figure 1B:
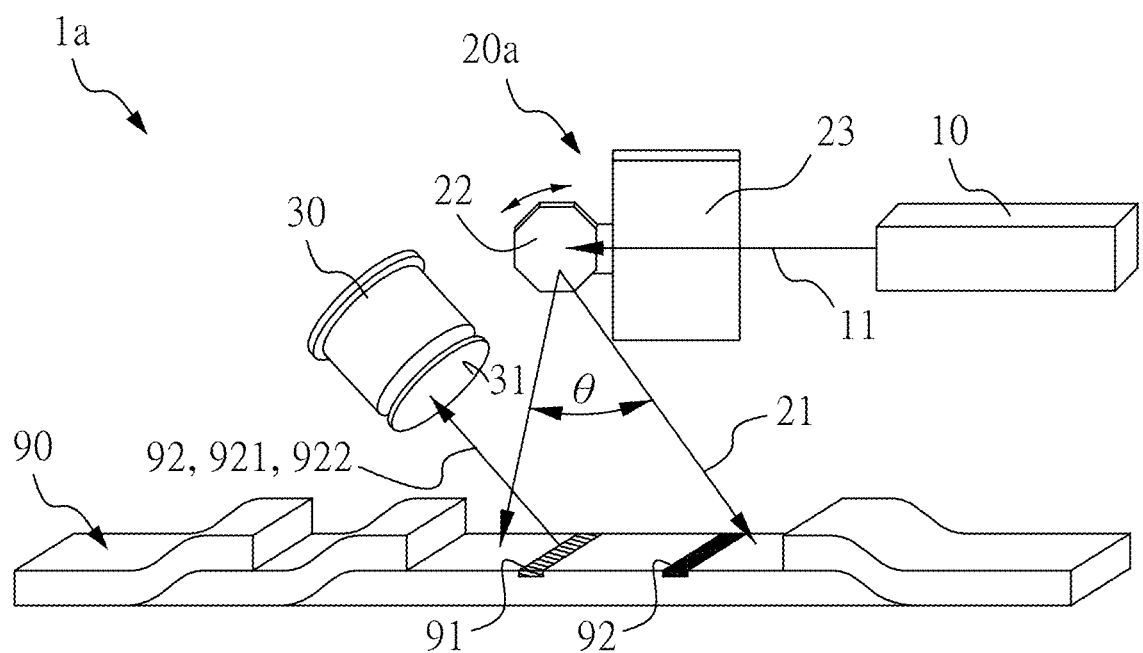
FIG. 1B illustrates a schematic diagram of a second embodiment of a detection system of the present disclosure.

Please refer to FIG. 1A and FIG. 1B. FIG. 1A illustrates a schematic diagram of a first embodiment of a detection system of the present disclosure and FIG. 1B illustrates a schematic diagram of a second embodiment of a detection system of the present disclosure.

A detection system 1, for detecting an object of interest in a lateral flow immunoassay strip 90. According to one embodiment of the present disclosure, the lateral flow immunoassay strip 90 can be but not limited to an ovulation test strip, a pregnancy test strip or a COVID-19 antigen test strip. The object of interest is luteinizing hormone (hereinafter referred to as LH) for ovulation test strips, human chorionic gonadotropin (hereinafter referred to as hCG) for pregnancy test strips, or full-length nucleoproteins (hereinafter referred to as NP) of SARS-CoV-2 for COVID-19 antigen test strips. The lateral flow immunoassay strip 90 comprises a detection carrier 91 and a reporter, wherein the detection carrier 91 is a nitrocellulose (NC) membrane and with a control zone 911 and a test zone 912 situated thereon. The reporters on the control zone 911 and the test zone 912 can be gold nanoparticles (hereinafter referred to as GNPs) or colored latex beads (hereinafter referred to as CLBs).

As shown in FIG. 1A, the first embodiment of the detection system 1 comprises a laser light source 10, a scanning and spatial modulation module 20, a signal acquisition assembly 30 and a processing device 40. The laser light source 10 provides a laser light 11, the scanning and spatial modulation module 20 receives the laser light 11 and then provide a scanning and spatially modulating laser beam 21 for irradiating the reporters on the control zone 911 and the test zone 912 to generate a detecting signal 92. The signal acquisition assembly 30 receives the detecting signal 92 and electronically connects to the processing device 40, wherein the processing device 40 receives the detecting signal 92 from the signal acquisition assembly 30.

According to one embodiment of the present disclosure, the laser light 11 is a continuous-wave green laser or a continuous-wave red laser. The scanning and spatial modulation module 20 is a Galvo scanning mirror system which conducts at the frequency between 0 Hz and 1 kHz; or between 0 Hz and 15 Hz; or between 1 Hz and 15 Hz; or between 10 Hz and 100 Hz; or between 15 Hz and 250 Hz; or between 200 Hz and 500 Hz; or between 300 Hz and 800 Hz; or between 350 Hz and 1 kHz, and a ramp voltage and a sinusoidal voltage with the root mean square value of 0.2V is applied to the Galvo scanning mirror system to produce the scanning and spatially modulating laser beam 21. According to a specific embodiment of the present disclosure, the scanning and spatial modulation module 20 is a Galvo scanning mirror system and conducts at the frequency of 10 Hz and a root mean square value of the sinusoidal voltage is 0.2V. The signal acquisition assembly 30 is a photodiode 31 with a fluorescence filter 32 for selectively detecting the detecting signal 92, wherein the fluorescence filter 32 can be a green filter, an orange filter, or a yellow filter. According to one embodiment of the present disclosure, the detecting signal 92 comprises a scattering signal 921 and a fluorescence signal 922. The orange filter is selected for detecting the fluorescence signal 922 while the laser light 11 is the continuous-wave green laser. In the first embodiment of the present disclosure, the processing device 40 is a microprocessor to perform as a moving average smoothing filter and the second derivative or a lock-in amplifier to analyze the detecting signal 92. The analyzed the detecting signal 92 includes the scattering signal 921 and the fluorescence signal 922 for different kinds of lateral flow immunoassay strips 90 such as an ovulation test strip, a pregnancy test strip or a COVID-19 antigen test strip will be discussed later.

As shown in FIG. 1A and FIG. 1B, the difference between the first embodiment of the detection system 1 and the second embodiment of the detection system 1a is the scanning and spatial modulation module 20a. The scanning and spatial modulation module 20a of the second embodiment is a reflection mirror 23 and a stepper motor 24, wherein the reflection mirror 23 is mounted on the stepper motor 24 and the stepper motor 24 drives the reflection mirror 23 to facilitate the scanning and spatially modulating laser beam 21 to irradiate the reporters on the control zone 911 and the test zone 912 on the lateral flow immunoassay strip 90. According one embodiment of the present disclosure, a scan angle θ of the scanning and spatially modulating laser beam 21 for irradiating a lateral flow immunoassay strip is ranged between 90°>θ>0° or 45°>θ>0°.

It is noted that the lateral flow immunoassay strip 90 are convention lateral flow immunoassay test strips available in pharmaceutical shops. And for this embodiment, the immunoassay for the lateral flow immunoassay strip 90 was carried out by first dipping the lateral flow immunoassay strip 90 vertically in sample solutions (100 µL/each) containing the antigens of interest for 15 mins to complete the capillary flow. And then the detection system 1 performs the detection on the lateral flow immunoassay strip 90. In addition, the structures of the detection carrier 91(NC membrane) obtained from MDI Membrane Technologies were investigated with a scanning electron microscope (Phenom ProX, Phenom-World) at an acceleration voltage of 15 kV in advance. The fluorescence spectra of detection carrier 91(NC membrane) were acquired with a CCD-based spectrometer consisting of a continuous-wave 532 nm laser (DPGL2100F, Photop Suwtech), a dichroic beam splitter (Z532RDC, Chroma), a long-working distance microscope objective lens (50×, Mitutoyo), a longpass edge filter (E550LP, Chroma), and a multichannel analyzer (C7473, Hamamatsu), as described previously. The detection carrier 91 (NC membrane) is a colorless and highly porous medium and NC membranes are commonly used in commercially available test strips. According to the structure of the NC membrane obtained by the scanning electron microscope, the NC membrane has a fibrous architecture with randomly arranged pores of about 5-15 µm in diameter. The typical dimensions of the NC membrane were 20 mm (length)×4 mm (width)×100 µm (thickness), along with a polystyrene backing of 100 µm in thickness.

Figure 2:
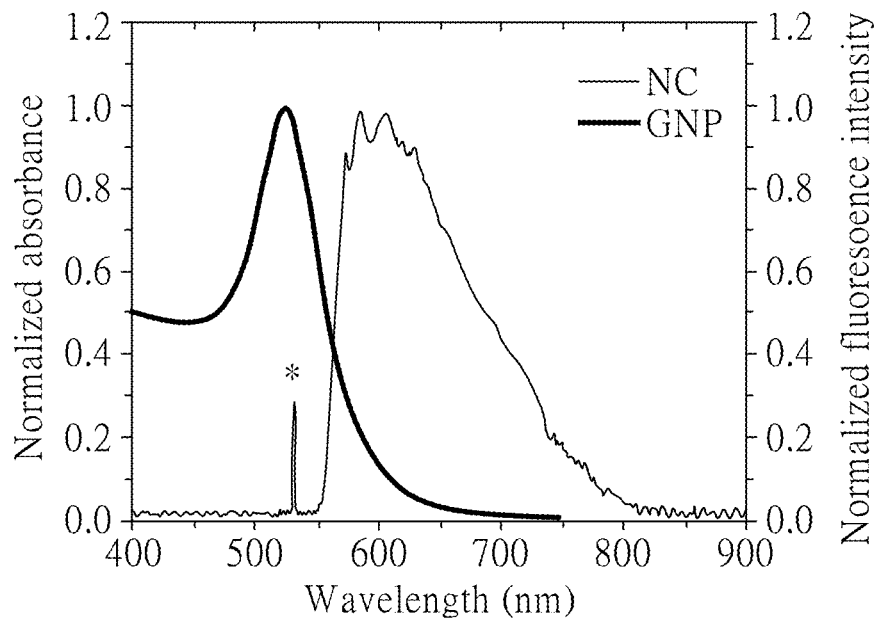
FIG. 2 illustrates the comparison of the fluorescence signal (fluorescence emission spectrum) of detection carrier (nitrocellulose membrane) and the absorption spectrum of reporter (40-nm gold nanoparticles) in solution.

Please refer to FIG. 2. FIG. 2 illustrates the comparison of the fluorescence signal (fluorescence emission spectrum) of detection carrier (nitrocellulose membrane) and the absorption spectrum of reporter (40-nm gold nanoparticles) in solution.

As shown in FIG. 2, when detection carrier 91 (NC membrane) is exposed to a continuous-wave green laser (e.g. wavelength of 520 nm and power of 10 mW), the detection carrier 91 (NC membrane) is generated strong scattered signal 921 and fluorescence signal 922. The asterisk denotes in FIG. 2 the unfiltered laser light at 532 nm. The scattering signal 921 (i.e. the diffuse reflected light with a wavelength of 520 nm) is collected by the signal acquisition assembly 30 with an active area of 10×10 mm$^2$ behind a 09 mm clear aperture and placed about 30 mm away from the laser excitation spot on the NC membrane was about 0.1 mW, i.e. ~1% of the excitation power. As for the fluorescence signal 922, a total power of ~0.1 µW at the wavelength longer than 570 nm is obtained, which exceeded the noise equipment power (NEP=2×10$^{-13}$ W/Hz$^{-1/2}$) of the Si-based photodiode by 6 orders of magnitude within a detection time. Spectrometric analysis of the fluorescence signal 922 showed a broad band peaking at ~600 nm with a width of more than 100 nm. These characters (such as intensity and spectral width) together make the fluorescence signal 922 suitable for use as a light source for the absorption measurements of red and black colored reporters, including CLBs and GNPs of various sizes.

Figure 3:
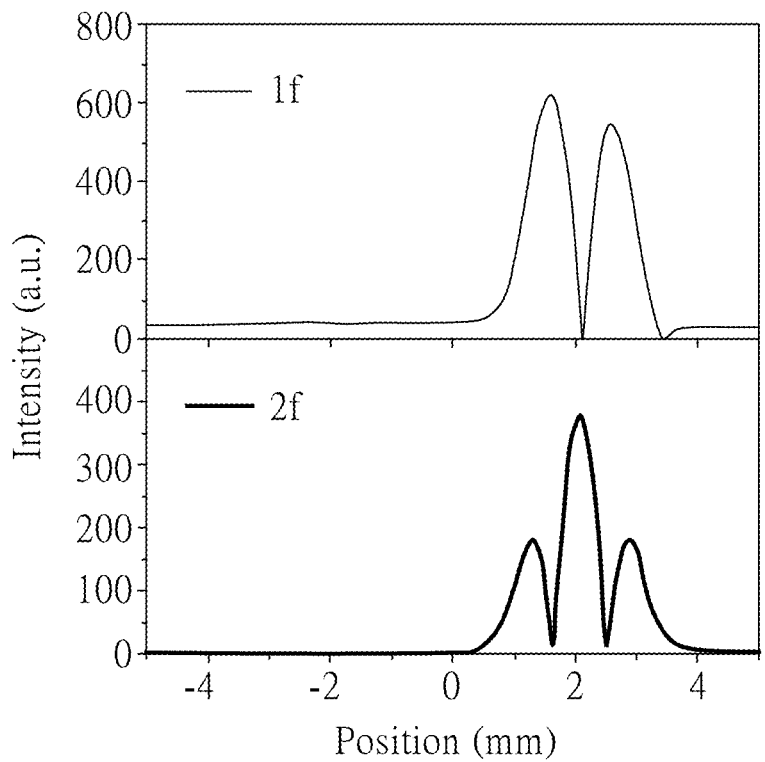
FIG. 3 illustrates the first harmonic and second harmonic of the spatially modulated signals for applying GNPs as reporters captured on the control line of a pregnancy test strip.

Please refer to FIG. 3. FIG. 3 illustrates characterization of the detection signals for applying GNPs as reporters captured on the control zone of a pregnancy test strip.

As shown in FIG. 3, the characterized the performance of the detection signals for GNPs captured on the control zone of a pregnancy test strip is presented. The magnitudes of the spatially modulated signals in x and y directions were detected at the first (1f) and second (2f) harmonic regions. In this embodiment, the scanning and spatial modulation module 20 conducts at 10 Hz and the amplitude of the sinusoidal voltage applied to the Galvo scanner was 0.2 V (root mean square value); however, the present disclosure is not limited to the embodiment, the scanning and spatial modulation module 20 can conduct at the frequency between 0 Hz and 1 kHz; or between 0 Hz and 15 Hz; or between 1 Hz and 15 Hz; or between 10 Hz and 100 Hz; or between 15 Hz and 250 Hz; or between 200 Hz and 500H; or between 300 Hz and 800 Hz; or between 350 Hz and 1 kHz. FIG. 3 shows the measured the detecting signal 92 appearing only in the control zone 91 of the lateral flow immunoassay strip 90 after conducting the assays using phosphate-buffered saline (hereinafter referred to as PBS) containing 3% bovine serum albumin (hereinafter referred to as BSA) (without the hCG antigen) as the sample solution. FIG. 3 shows two intensity profiles of the lateral flow immunoassay strip 90 of a pregnancy test strip while the control zone was scanned by the scanning and spatially modulating laser beam 21 of the detection system 1.

The processing device 40 is a microprocessor performing as a moving average smoothing filter and the second derivative or a lock-in amplifier to analyze the detecting signal 92. As shown in FIG. 3. both the intensity profiles were plotted in terms of the magnitudes ($R=\sqrt{X+Y^2}$) of the detecting signal 92 vectors without knowing their phases against the reporter position on the lateral flow immunoassay strip 90, processed by a lock-in amplifier. As seen, the shapes of the profiles varied, depending on how the detecting signals 92 were detected in either the first (1f) or the second (2f) harmonic frequency channel. The appearances of two or three peaks are results of the first or second derivatives of a Gaussian-like function, respectively. Aside from the detection frequency, the amplitude of the scanning and spatially modulating laser beam 21 also governed the outcome of the experiments. For a lateral flow immunoassay strip 90, the width of the control zone 911 or the a test zone 912 is around 1 mm, which is typical for the control and test lines commonly used in the lateral flow immunoassay strip 90 available commercially. The 2f signals are weak if the amplitude of the spatial modulation is less than 1 mm. Empirically, it is found that the experimental conditions to yield the highest signal-to-noise ratios (S/N) were f=10 Hz and the root mean square value of the sinusoidal voltage applied to the Galvo scanning mirror system=0.2 V, together with the detection of the signals at the second harmonic region with a lock-in time constant of 100 ms for the lock-in amplifier.

After optimized the experimental conditions shown in FIG. 2 and FIG. 3, the ultimate detection limit of the detection system 1 for reporter as GNPs on the lateral flow immunoassay strip 90 can be measured. Tested with a dry, blank detection carrier 91 (NC membrane), the noise level of the detection in the 2f channel was found to be $\Delta I/I < 1 \times 10^{-5}$. For 40-nm GNPs with an absorption cross section of $\sigma = 3.2 \times 10^{-11}$ cm$^2$/particle at 530 nm, this noise level suggests a detection limit of $3 \times 10^5$ particles/cm$^2$ (or $3 \times 10^3$ particles/mm$^2$) by detection system 1, if the GNP particles used as the reporters in the assays have a size of 40 nm in diameter and their absorption cross sections are the same as those in solution. The LOD can be readily lowered by one order of magnitude if larger GNP particles such as the 100-nm ones are used. These particles have a 20-fold larger absorption cross section than the 40-nm ones at the peak position. The same sensitivity enhancement is achievable by using CLBs as the reporters that are 3-fold as large in size since the numbers of dye molecules doped in these polystyrene particles scale with their volumes.

Figure 4:
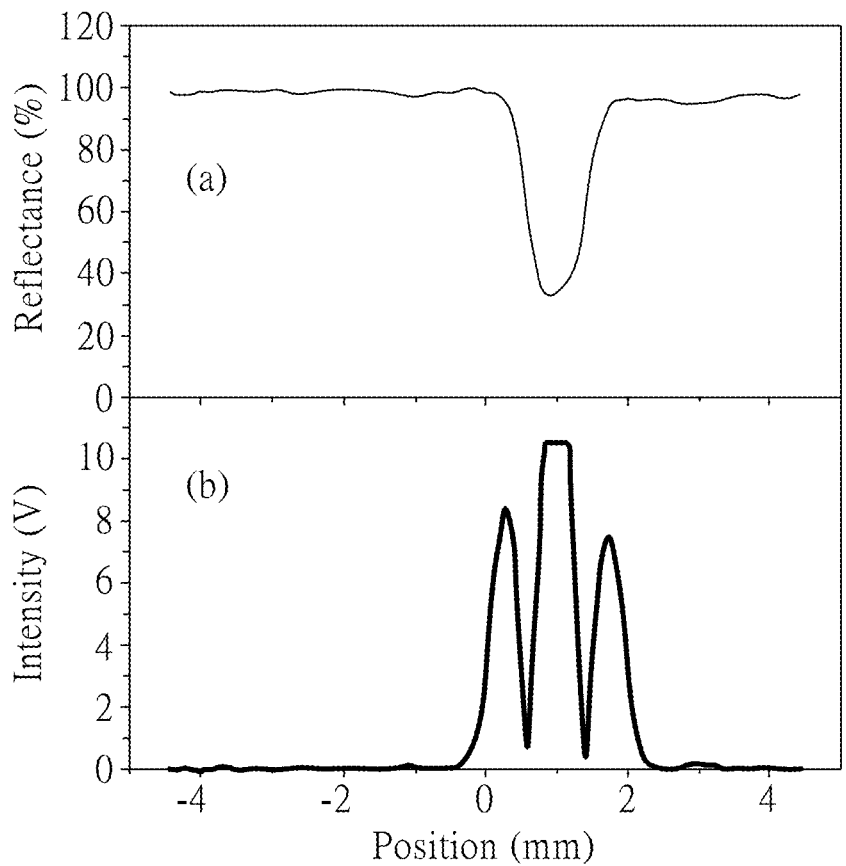
FIG. 4(a) illustrates typical absorption signals observed for GNPs captured on the control zone of a pregnancy test strip without being spatially modulated.
FIG. 4(b) illustrates typical spatially modulated signals observed for GNPs captured on the control zone of a pregnancy test strip.

Please refer to FIG. 4(a) and FIG. 4(b). FIG. 4(a) illustrates typical signals observed for GNPs captured on the control zone of a pregnancy test strip without being spatially modulated and FIG. 4(b) illustrates typical signals observed for GNPs captured on the control zone of a pregnancy test strip. In this embodiment, the scanning and spatial modulation module 20 was conducted at a 10 Hz, the amplitude of the sinusoidal voltage applied to the Galvo scanner was 0.2 V (root mean square value), and the signals were detected at the second harmonic frequency by the lock-in amplifier. Saturation of the SMALFIA signal occurred at 10.5 V.

As shown in FIG. 4(a) and FIG. 4(b), the experimental data with and without the implementation of the scanning and spatially modulating laser light 21 for lateral flow immunoassay strip 90 of a pregnancy test strip using PBS containing 3% BSA (without hCG) as the sample solution. The result of the direct absorption profile is plotted in terms of diffuse reflectance, assuming a constant reference level to obtain the percentages. As seen in FIG. 4(a) and FIG. 4(b), a significant enhancement of the S/N levels by more than one order of magnitude was achieved by use of the scanning and spatially modulating laser light 21. Although the observed intensity profiles of the detecting signal 92 are complicated by the presence of three peaks due to the second derivatives, the baseline of the detecting signal 92 is strikingly flat and the detecting signal 92 is nearly background-free. The feature, which is lacking in the direct absorption profile (FIG. 4(a)) makes the quantification of the reporters (GNPs and CLBs) as well as the probed antigens on in a lateral flow immunoassay strip 90 easy and simple with the detection system 1.

Figure 5:
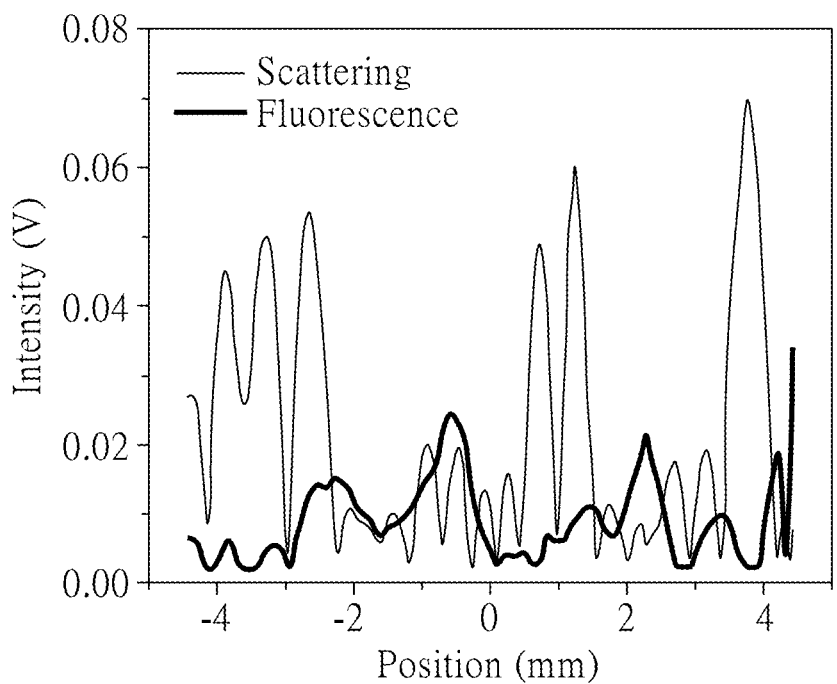
FIG. 5 illustrates the comparison of the scattering signal and the fluorescence signal of a blank ovulation test strip obtained by the detection system of the present disclosure.

Please refer to FIG. 5, FIG. 5 illustrates the comparison of the scattering signal and the fluorescence signal of a blank ovulation test strip obtained by the detection system of the present disclosure.

The spatial modulation spectroscopy ensures its high-sensitivity detection only in homogeneous medium. Any inhomogeneities (such as structural non-uniformity and surface roughness) in the medium (such as NC membrane) can produce undesirable background signals in the spatial modulation measurements for scattered laser light and thus limit its detection capability, as shown in FIG. 5. This is an experimental finding with detection system 1 detecting blank lateral flow immunoassay strips 90 from various sources, where some background light scattering signals appeared reproducibly in the line profiles (FIG. 5). Although these signals were only sparsely distributed, they in effect reduced the detection sensitivity by roughly one order of magnitude. The highest S/N achievable under this circumstance was about 500.

Figure 6:
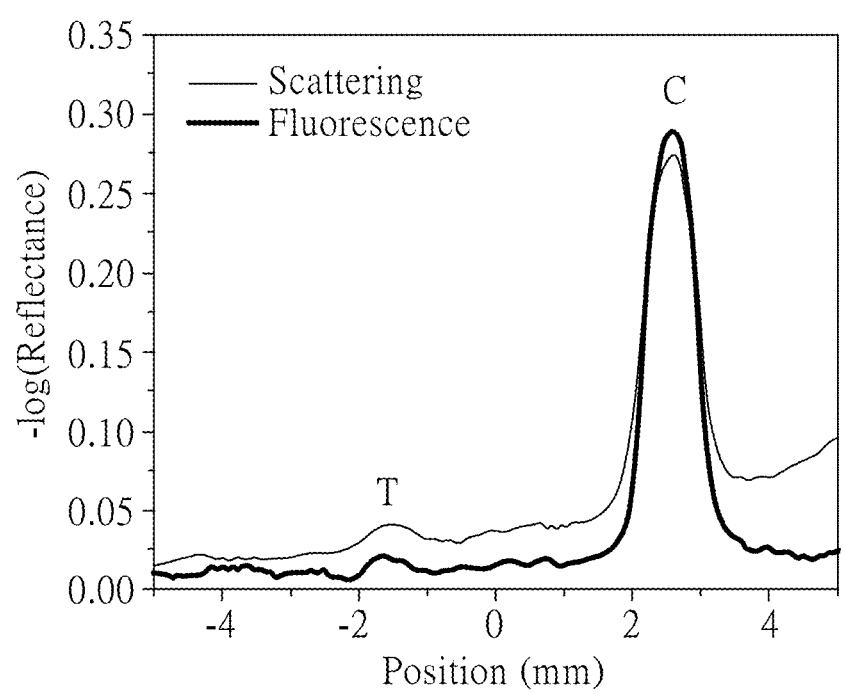
FIG. 6 illustrates the comparison of the line profiles of GNPs captured on the same ovulation test strip detected in the scattering signal and the fluorescence signal.

Please refer to FIG. 6, FIG. 6 illustrates the comparison of the line profiles of GNPs captured on the same ovulation test strip detected in the scattering signal and the fluorescence signal.

To circumvent the above-mentioned problem in FIG. 5, the orange filter is selected for detecting the fluorescence signal 922 while the laser light 11 is the continuous-wave green laser because the detection carrier 91 (the NC membrane) is able to emit strong red fluorescence signal when exposed to the green laser. These emission signals overlap in part with the absorption peaks of GNPs (shown in FIG. 2) and thus the presence of these particles on the strips should be revealed by detecting the fluorescence emission over the wavelength of 550-600 nm. As shown in FIG. 6, in comparison to scattering signal 921, the fluorescence signal 922 is expected to be much less affected by the detection carrier 91 (the NC membrane) inhomogeneities so long as the detection carrier 91 thickness is uniform. Indeed, by replacing the green emission filter with the orange emission filter, a reduction of the noise level by a factor of 2 (FIG. 6). The reduction allowed the detection system 1 to observe very weak fluorescence signal 922, which were essentially undetectable by scattering signal 921, with the fluorescence-based method even in the direct absorption mode.

Figure 7:
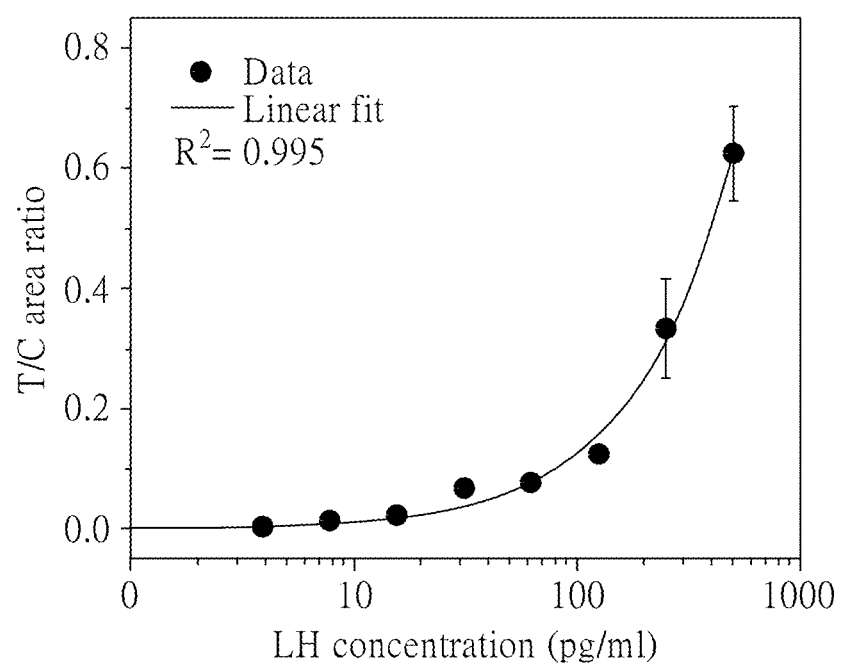
FIG. 7 illustrates the scattering signal of LH using GNPs as the reporters.

Please refer to FIG. 7, FIG. 7 illustrates the scattering signal of LH using GNPs as the reporters.

FIG. 7 shows a typical result of the detection system 1, where the lateral flow immunoassay strip 90 is ovulation test strips applied to carry out the immunoassays using urine from a healthy male adult as the sample. Further decrease of the background noise level by a factor of 10 is expected if more uniformly fluorescent strips are available, which should allow the detection to approach its ultimate limit as discussed in the earlier section. The first application of detection system 1 detects the immunoassays with commercially available ovulation test strips using GNPs as the reporters and the naked eye for color visualization. Specifically, employing human LH as the antigen and determined the LOD of this immunoassay with the detection system 1 by obtaining the scattering signal 921. LH is a hormone, known as a gonadotropin, produced in the pituitary glands of both men and women. The hormone is a heterodimeric glycoprotein with a molecular weight of approximately 30 kDa. It plays an important role in sexual development and functioning. 33 The normal range of LH in blood for male adults is 1.24-7.8 IU/L.

For female adults, the normal range depends on their menstrual cycle and is 14.2-52.3 IU/L for women who have gone through menopause. The normal range for children (age 1-10) is low, being 0.03-3.9 IU/L for girls before their puberty begins. To carry out the ovulation tests, the sample solutions containing LH (with an activity of ≥8,500 IU/mg) in 3% BSA/PBS with 2-fold serial dilutions is prepared. The line profiles of the individual strips after the assays were then acquired by using detection system 1. To reduce the variations between the strips, normalizing the integrated intensity area of the test zone by that of the control zone (i.e. T/C) in the individual profile. This allowed us to achieve linear measurement over the LH concentration range of 0-1 ng/mL, as shown in FIG. 7. The LOD was ~0.02 ng/mL or ~0.17 IU/L, which was about 10-fold lower than that by color visualization with the naked eye for commercially available ovulation test strips. It should be noted that the measurement capability of detection system 1 matches well with the clinical practices that measure the LH levels to determine whether there is a pituitary gland problem. Moreover, and perhaps more importantly, the availability of detection system 1 enables people to quantify their own LH levels at home using urine-based ovulation test strips without the need of drawing blood for laboratory testing with ELISA.

Figure 8:
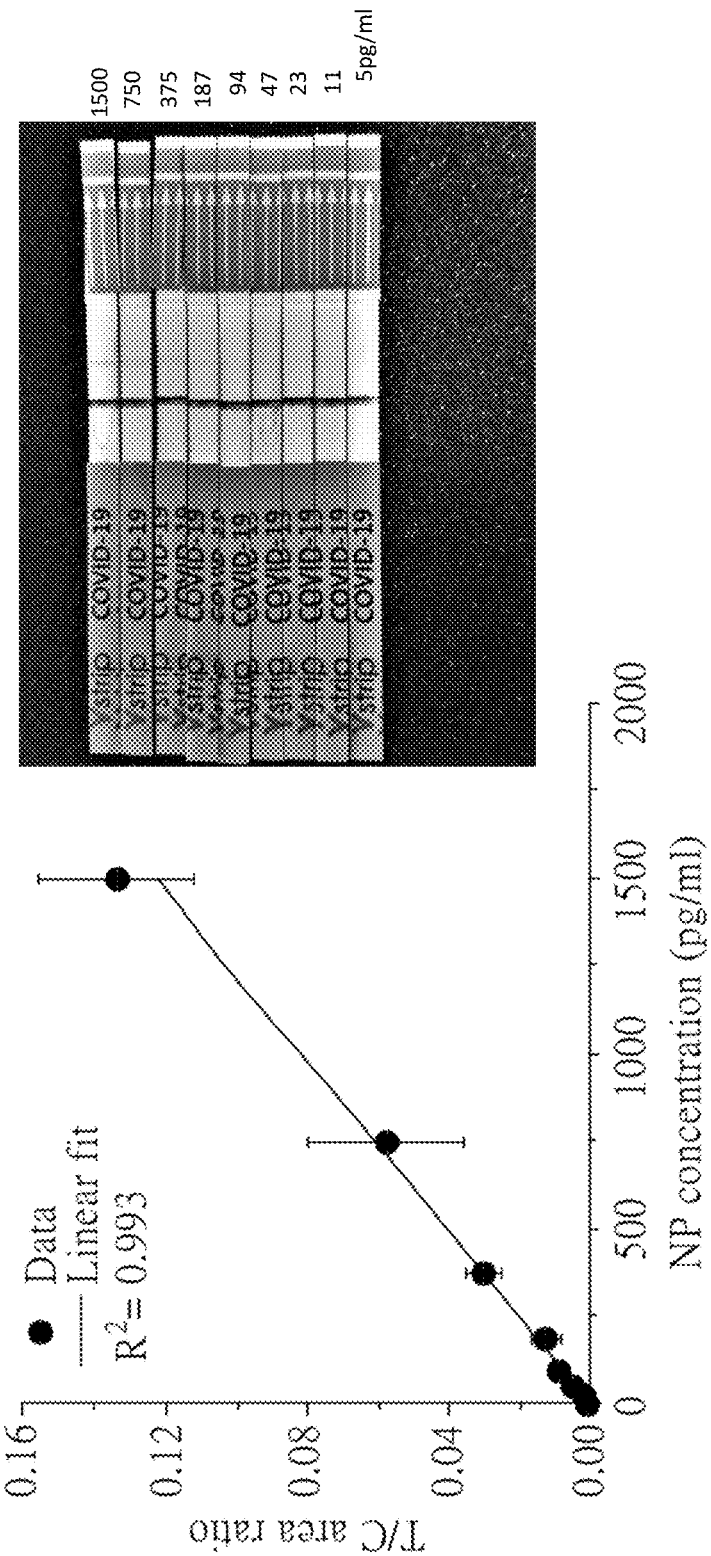
FIG. 8 illustrates the comparative of the fluorescence signal of LFIA of SARS-CoV-2 NP using CLBs as the reporters obtained by detection system of the present disclosure (left) and color visualization (right)

Please refer to FIG. 8, FIG. 8 illustrates the comparative of the fluorescence signal of LFIA of SARS-CoV-2 NP using CLBs as the reporters obtained by detection system of the present disclosure (left) and color visualization (right).

The second application of the detection system 1 is focused on the detection of COVID19 antigens. It is focused to the nucleoproteins (NPs) of the SARS-CoV-2 virus, and employed recombinant full-length NPs as the test samples. Using commercially available COVID-19 test strips with CLBs as the reporters, it is found that the bandpass filter over the wavelength of 600-660 nm worked well when the fluorescence signals from the detection system 1 were obtained. In this experiment, the COVID-19 test strips dipped into the NP solution after serial dilution (100 µl/each), followed by performing the detection system 1 according to the protocols developed above for LH. Presented in the right inset of FIG. 8 is a photograph of the used strips, showing a black color in the control line and a red color in the test line. The LOD obtained with the detection system 1 was ~0.02 ng/mL, nearly 10-fold lower than the detection limit with the naked eye. It has been well documented in literature that each SARS-CoV-2 virion can contain 35-40 viral RNA-protein (vRNP) complexes and within the individual vRNP, ~800 nt of the genomic RNA are wrapped around ~12 copies of NP. Given a molecular weight of ~100 kDa for the NP dimer and that each SARS-CoV-2 contains ~500 copies of the nucleoprotein, this result suggests a detection limit of ~$6 \times 10^5$ virions/mL. It should be emphasized here that the LOD of detection system 1 so determined for the coronavirus is primarily limited by the non-specific binding among capture antibodies, BSA, and detection antibodies, rather than the intrinsic sensitivity of detection system 1. A 10-fold reduction of the LOD is possible if better antibody pairs are available. The detection system 1 is speedy and sensitive, making it suitable for quantifying the levels of SARS-CoV-2 infection among patients and medical staffs in clinics and hospitals.

Figure 9A:
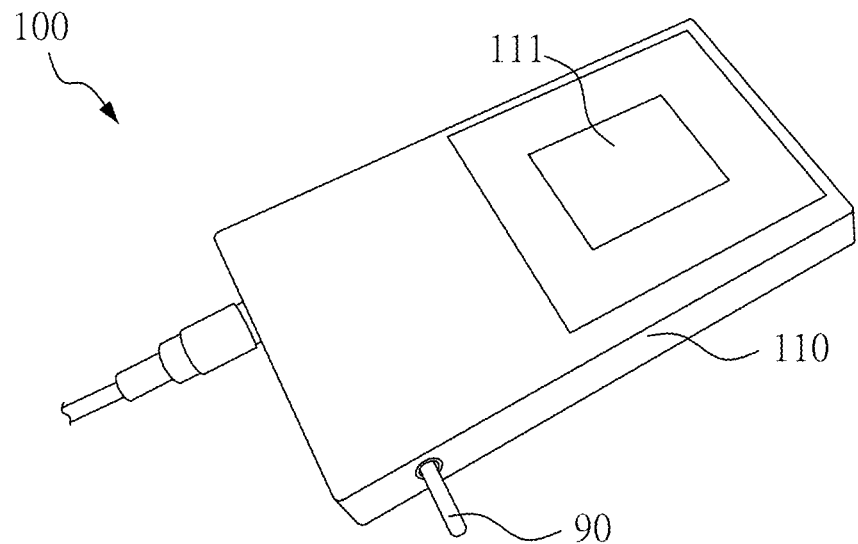
FIG. 9A illustrates a schematic diagram of an embodiment of a portable detection device of the present disclosure.
Figure 9B:
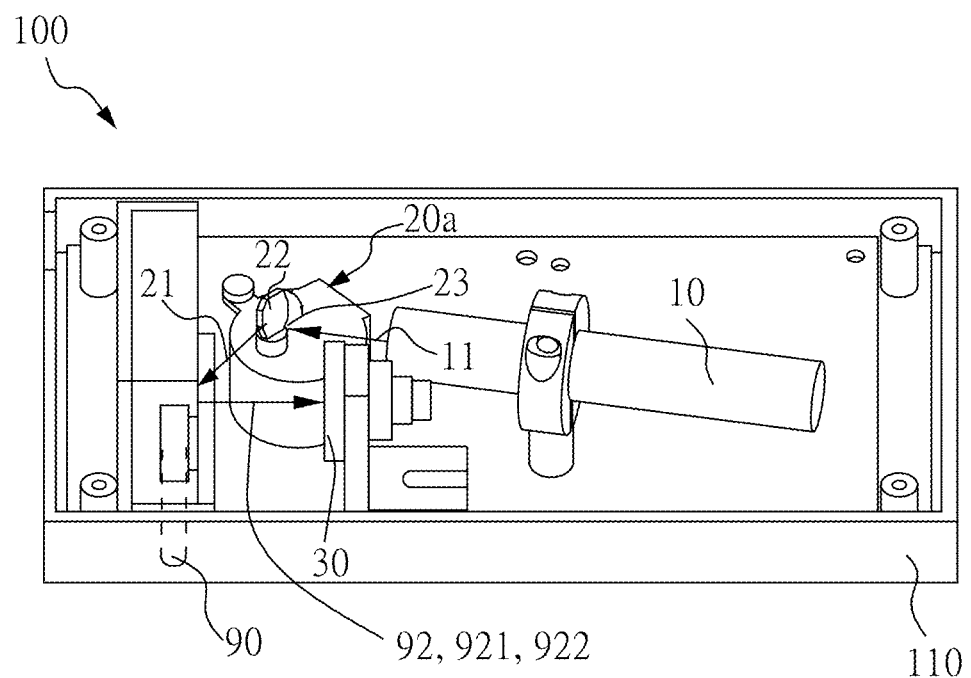
FIG. 9B illustrates a schematic diagram of an embodiment of a portable detection device without a cover of the present disclosure.

Please refer to FIG. 9A and FIG. 9B. FIG. 9A illustrates a schematic diagram of an embodiment of a portable detection device of the present disclosure and FIG. 9B illustrates a schematic diagram of an embodiment of a portable detection device without a cover of the present disclosure.

As shown in FIG. 9A and FIG. 9B, a portable detection device 100, for detecting an object of interest in a lateral flow immunoassay strip 90, wherein the lateral flow immunoassay strip 90 comprises a detection carrier 91 and a reporter, the detection carrier 91 comprising a control zone 911 and a test zone 912, the portable detection device 1 comprises a laser light source 10, a scanning and spatial modulation module 20, a signal acquisition assembly 30, a processing device 40, and a housing 110 for accommodating the laser light source 10, the signal acquisition assembly 20, the signal acquisition assembly 30, and the processing device 40. The laser light source 10 provides a laser light 11, the scanning and spatial modulation module 20 receives the laser light 11 and then produce a scanning and spatially modulating laser beam for irradiating the reporters on the control zone 911 and the test zone 912 to generate a detecting signal 92. The signal acquisition assembly 30 receives the detecting signal 92. The processing device 40 electronically connects to the signal acquisition assembly 30, wherein the processing device 40 receives the detecting signal 92 from the signal acquisition assembly 30. The housing 110 further comprises a touch screen 111 electrically connected to the processing device 30 for displaying the detecting signal 92.

As shown in FIG. 9A and FIG. 9B, the laser light 11 is a continuous-wave green laser or a red laser and the detecting signal 92 comprises a scattering signal 921 and a fluorescence signal 922. The scanning and spatial modulation module 20 in this embodiment is a reflection mirror 23 and a stepper motor 24, wherein the reflection mirror 23 is mounted on the stepper motor 24 and the stepper motor 24 drives the reflection mirror 23 to produce the scanning and spatially modulating laser beam 21 for irradiating the reporters on the control zone 911 and the test zone 912 on the lateral flow immunoassay strip 90, wherein a scan angle θ of the scanning and spatially modulating laser beam 21 for irradiating a lateral flow immunoassay strip is ranged between 90°>θ>0° or 45°>θ>0°. The signal acquisition assembly 30 is a photodiode with a fluorescence filter for selectively detecting the fluorescence signal 922. The fluorescence filter can be a green filter, an orange filter, or a yellow filter. The orange filter is selected for detecting the fluorescence signal 922 while the laser light 11 is the continuous-wave green laser.

The portable detection device 100 facilitates practical applications of detection system 1 in point-of-care testing, it is desirable to make the portable detection device 100 handheld. The portable detection device 100 is lightweight, equipped with a touchscreen 111, and better in battery operation. Compared with standard detection system 1, the portable detection device 100 as discussed in the introduction section is a more suitable approach to realize the concept.

FIG. 9A and FIG. 9B show schematic diagrams of the experimental setup for the portable detection device 100, in which scanning and spatially modulating laser beam 21 is scanned over the control zone 911 and the test zone 912 by a reflection mirror 13 mounted on a stepper motor 14 (28BYJ-48, MikroElektronika). With a beam diameter of scanning and spatially modulating laser beam 21 about 1 mm, laser light source 10 (532 nm, Edmund Optics) has an output power of 10 mW and is used without focusing. The resulting fluorescence emission from detection carrier 91 (the NC membrane) is collected through a 630/60 bandpass filter (630/30, Chroma) for detection by signal acquisition assembly 30 (a photodiode, PIN-10D, OSI Optoelectronics) with an active area of 1 $cm^2$.

FIG. 9A shown a prototype of the portable detection device 100, also called as quantitative mobile immune analyzer (QMIA), which has dimensions of 190 mm (length)×100 mm (width)×60 mm (height) and a total weight of less than 600 g, and can be comfortably held by an adult person.

Figure 10:
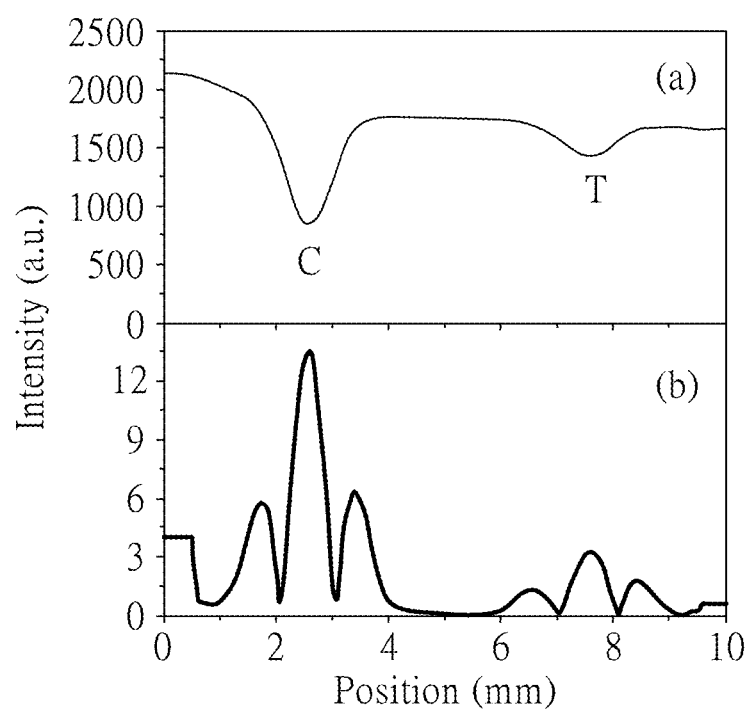
FIG. 10 (a) illustrates the original profile obtained with QMIA for SARS-CoV-2 nucleoproteins using CLBs as the reporters. The nucleoproteins concentration is 7.8 ng/mL.

Please refer to FIG. 10 (a) and FIG. 10 (b). FIG. 10 (a) illustrates (a) Original obtained with QMIA for SARS-CoV-2 NP using CLBs as the reporters. The NP concentration is 7.8 ng/mL and FIG. 10 (b) illustrates second-order-differentiated signals obtained with QMIA for SARS-CoV-2 NP using CLBs as the reporters.

The portable detection device 100 is applied for detecting SARS-CoV-2 NP using CLBs as the reporters for testing the performance of the portable detection device 100. As noted in FIG. 10 (a), the baseline of the original signals obtained with portable detection device 100 is not flat, which prevents precise measurement of the absorption band areas of both control zone and test zone on the lateral flow immunoassay strip 90. After treating the data with the Savitzky-Golay smoothing filter, followed by taking the second-order differentiation and the absolute value of the numbers, the line profile shows a profile very similar to that of the detection system 1, shown in FIG. 10 (b). Thanks to the dramatic baseline flattening effect, it is able to measure the integrated band areas with high precision. For the test zone, it is obtained a S/N>300 for the SARS-CoV-2 NP sample with a concentration of 7.8 ng/mL. The value suggests a LOD of ~0.03 ng/mL, which is comparable to that achieved with the detecting results of the detection system 1 in FIG. 8.

The detection system 1, 1a enhances in detection sensitivity by 10-100 folds and surpass that of the photothermal methods. Apart from the sensitivity, the detection system 1, 1a has the benefits of low maintenance, high safety, low cost, and high portability, as demonstrated by the development of a portable detection device 100. The detection system 1, 1a enable a higher sensitivity than color visualization of a lateral flow immunoassay strip with the naked eye by 1 order of magnitude. Additionally, the detection system 1,1a of the present disclosure is applicable for both dry and wet lateral flow immunoassay strips. The detection system 1, 1a and a portable detection 100 of the present disclosure are essential to making progress towards the realization of high-sensitivity point-of-care testing with the capability of one-step home diagnosis, not only for COVID-19 but for other infectious and chronic diseases as well.

It should be noted that many of the above-mentioned embodiments are given as examples for description, and the scope of the present invention should be limited to the scope of the following claims and not limited by the above embodiments.

What is claimed is:

1. A detection system, for detecting an object of interest in a lateral flow immunoassay strip, wherein the lateral flow immunoassay strip comprises a detection carrier and a reporter, the detection carrier comprising a control zone and a test zone, the detection system comprising:
a laser light source, for providing a laser light;
a scanning and spatial modulation module, for receiving the laser light and then produce a scanning and spatially modulating laser beam for irradiating the reporters on the control zone and the test zone to generate a detecting signal, wherein the scanning and spatial modulation module is a Galvo scanning mirror system and the scanning and spatial modulation module comprises a reflection mirror and a stepper motor and the scanning and spatially modulating laser beam is produced by the reflection mirror driven by the stepper motor, wherein the Galvo scanning mirror system conducts at a frequency between 0 Hz and 1 kHz, and a ramp voltage and a sinusoidal voltage with the root mean square value of 0.2V is applied to a Galvo scanning mirror system to produce the scanning and spatially modulating laser beam;
a signal acquisition assembly, for receiving the detecting signal; and a processing device, electronically connected to the signal acquisition assembly, wherein the processing device receives the detecting signal from the signal acquisition assembly.

2. The detection system as claimed in claim 1, wherein a scan angle θ of the scanning and spatially modulating laser beam for irradiating the lateral flow immunoassay strip is ranged between 90°>θ>0° or 45°>θ>0°.

3. The detection system as claimed in claim 1, wherein the laser light is a continuous-wave green laser or a continuous-wave red laser.

4. The detection system as claimed in claim 3, the signal acquisition assembly is a photodiode with a fluorescence filter for selectively detecting the detecting signal.

5. The detection system as claimed in claim 4, the fluorescence filter can be a green filter, an orange filter, or a yellow filter.

6. The detection system as claimed in claim 5, the detecting signal comprising a scattering signal and a fluorescence signal and the orange filter is selected for detecting the fluorescence signal while the laser light is the continuous-wave green laser.

7. The detection system as claimed in claim 1, the processing device comprising a microprocessor performing a moving average smoothing filter and a second derivative or a lock-in amplifier to analyze the detecting signal.

8. The detection system as claimed in claim 1, the processing device analyzing the detecting signal by integrating an intensity area of the test zone by that of the control zone to quantify a concentration of the object of interest.

9. The detection system as claimed in claim 1, wherein the reporter is gold nanoparticles or colored latex beads and the detection carrier is a nitrocellulose membrane.

10. A portable detection device, for detecting an object of interest in a lateral flow immunoassay strip, wherein the lateral flow immunoassay strip comprises a detection carrier and a reporter, the detection carrier comprising a control zone and a test zone, the portable detection device comprising:
- a laser light source, for providing a laser light, wherein the laser light is a continuous-wave green laser or a red laser;
- a scanning and spatial modulation module, for receiving the laser light and then providing a scanning and spatially modulating laser beam for irradiating the reporters on the control zone and the test zone to generate a detecting signal, wherein the scanning and spatially modulating laser beam is produced by a reflection mirror rotating driven by a stepper motor;
- a signal acquisition assembly, receiving the detecting signal, wherein the signal acquisition assembly comprising a photodiode with a fluorescence filter configured to selectively detect the fluorescence signal, wherein the orange filter is selected for detecting the fluorescence signal while the laser light is the continuous-wave green laser;
- a processing device, electronic connecting to the signal acquisition assembly, wherein the processing device receives the detecting signal from the signal acquisition assembly; and a housing for accommodating the laser light source, the scanning and spatial modulation module, the signal acquisition assembly, and the processing device.

11. The portable detection device as claimed in claim 10, wherein a scan angle θ of the scanning and spatially modulating laser beam for irradiating a lateral flow immunoassay strip is ranged between 90°>θ>0° or 45°>θ>0°.

12. The portable detection device as claimed in claim 10, the fluorescence filter can be a green filter, or a yellow filter.

13. The portable detection device as claimed in claim 10, the detecting signal comprising a scattering signal and a fluorescence signal.

14. The portable detection device as claimed in claim 10, the housing further comprising a touch screen electrically connected to the processing device for displaying the detecting signal.

* * * * *